United States Patent

[11] 3,597,795

[72] Inventor  Kakuji Naito
 No. 49, 1-chome, Watarida-Shin-machi, Kawasaki-shi, Kanagawa-ken, Japan
[21] Appl. No. 765,295
[22] Filed Oct. 7, 1968
[45] Patented Aug. 10, 1971

[54] DIE HEAD FOR THE CONTINUOUS EXTRUSION OF PLASTIC FILM WITH PROFILES FOR A CLOSURE FOR USE IN PLASTIC BAGS
7 Claims, 4 Drawing Figs.
[52] U.S. Cl. .................................................. 18/14 R,
 18/12 DM, 264/95
[51] Int. Cl. ............................................... B29d 23/04
[50] Field of Search .......................................... 18/12 D, 14
 G, 14 R, 14 S, 14 V, 14 C; 264/95; 29/157 C

[56] References Cited
UNITED STATES PATENTS

| | | | |
|---|---|---|---|
| 2,971,250 | 2/1961 | Wahlin | 29/157 UX C |
| 3,233,286 | 2/1966 | Batosti et al. | 18/14 UX G |
| 3,266,093 | 8/1966 | Corbett | 18/146 UX G |
| 3,320,340 | 5/1967 | Luca | 264/95 |

Primary Examiner—Andrew R. Juhasz
Assistant Examiner—Leon Gilden
Attorney—Hill, Sherman, Meroni, Gross and Simpson ABSTRACT: A die head for the continuous extrusion of plastic for the manufacture of a plastic film having profile ledges for the bag closure which serves for the formation of plastic bags.

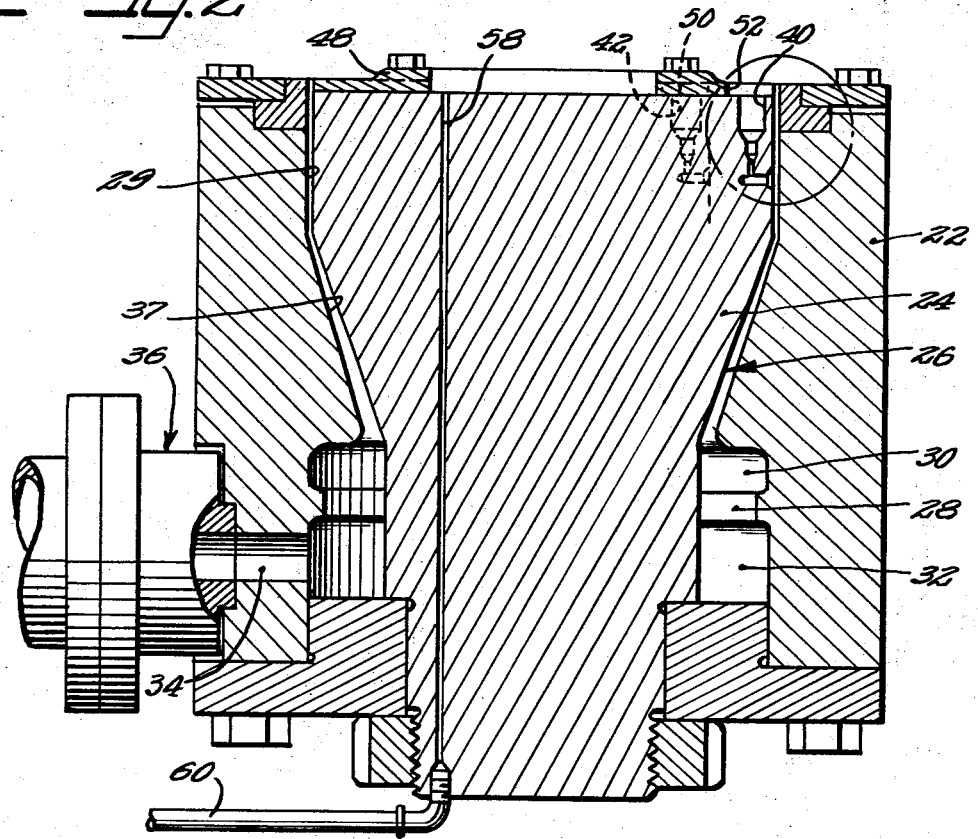
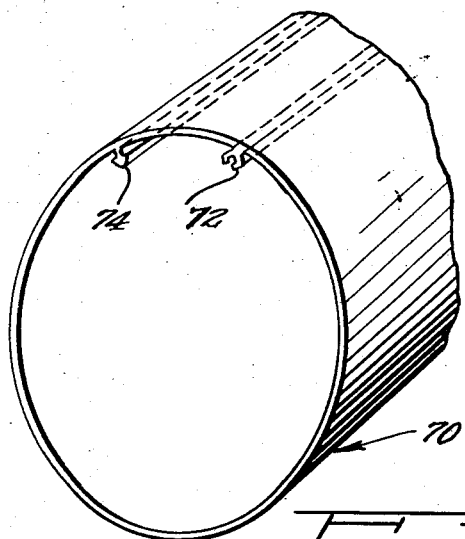
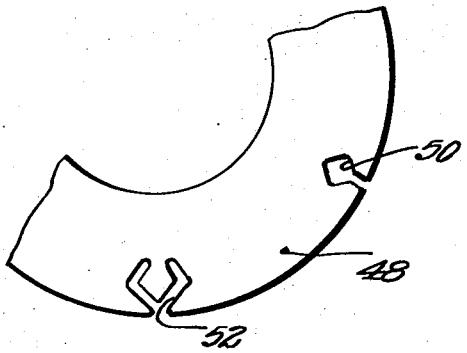

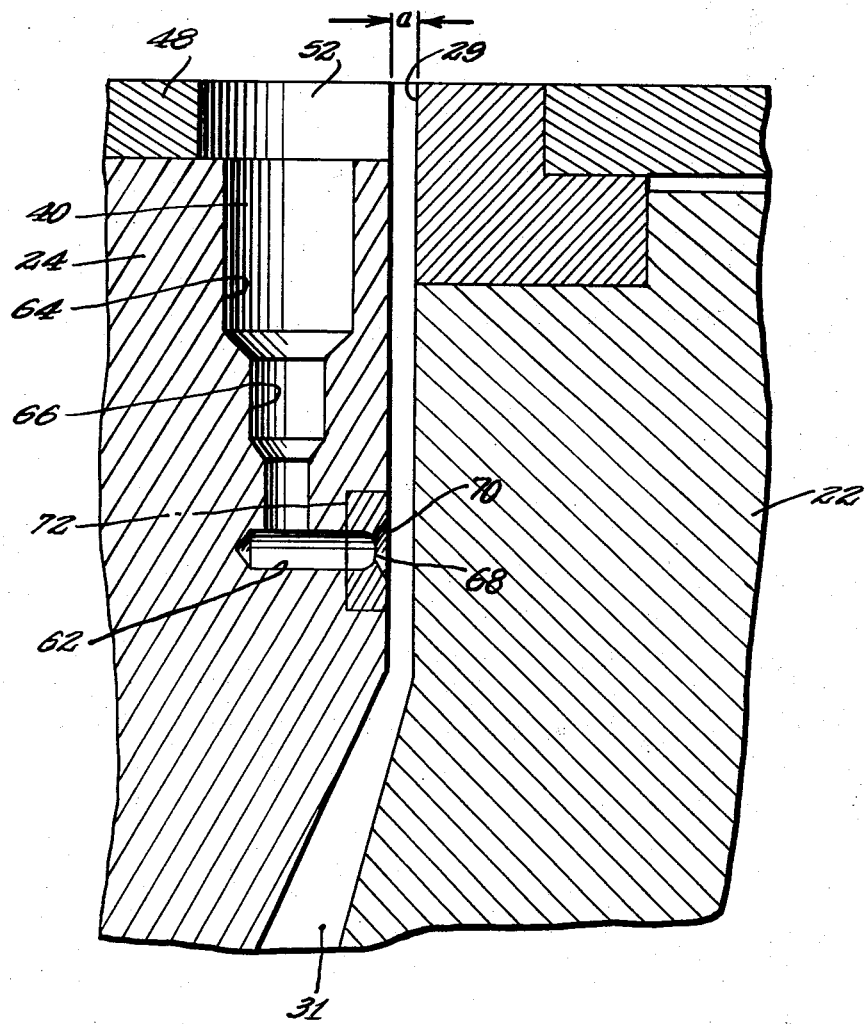

DIE HEAD FOR THE CONTINUOUS EXTRUSION OF PLASTIC FILM WITH PROFILES FOR A CLOSURE FOR USE IN PLASTIC BAGS

BACKGROUND OF THE INVENTION

Field of the Invention

This invention relates to a die head for the continuous extrusion of a plastic film which, on further treatment, serves for the formation of bags. The plastic film is provided with two profile ledges arranged in the longitudinal direction of the film which are to be brought in meshing engagement in relation to each other and which serve for the formation of a bag closure. The die head, which has an extrusion gap for the formation of the profile ledges on the film during the extrusion process, has in the area of its mouth a forming groove for each profile ledge adapted to their respective profiles, into which material flows through one supply channel at a time which is in communication with the extrusion gap.

To form the profile ledges on a plastic film to be manufactured, the flow of plastic for the formation of the profile ledges must be faultlessly controlled so as to insure that the profile ledges have, on the one hand, a very determined cross section and, on the other hand, leave the die head at such a speed that the formation on the plastic film which is also leaving the die head is not adversely affected.

Heretofore, the above extrusion was achieved by branching off through supply channels, in communication with the extrusion gap and ahead of the mouth, plastic from the plastic supply for the formation of the profile ledges. In this construction, a throttle member is arranged for each supply channel which is externally adjustable by means of a control member, for example an adjustment screw, to control the flow of the branched-off plastic material in the extrusion gap. The pressures prevailing in the extrusion gap make it necessary to arrange the throttle members—viewed in the flow direction of the plastic—ahead of the inlet openings of the supply channels; however, it is difficult to maintain a certain setting in these throttle members, which setting may not vary even slightly in view of the small cross section of the profile ledges, since frequently small shifts occur upon setting the control member.

SUMMARY OF THE INVENTION

These difficulties are avoided by the present invention in that the cross section of the intake port of the supply channels can be varied. In accordance with the invention, the intake port of the supply channels is thereby varied to a certain size, whereby the correct size of the cross section can be ascertained by working the material at the intake port. The size to which the intake ports are determined can not subsequently be affected externally so that perfect results can be ensured at minimum technical cost.

According to one embodiment of the invention, such variances of the intake ports of the supply channels can simply be achieved in that the material of the die head at the intake port of the supply channels can be deformed by upsetting. After completing the supply channels, the edges of the intake ports can, for example, be upset by means of a ball-shaped drift punch and their cross sections can thus be set to the required size. It is clearly evident that the invention can be realized advantageously with die heads having an elongated extrusion gap as well as those having a ring-shaped extrusion gap.

The invention can very advantageously be realized with a die head of the last-mentioned type, whose extrusion gap in the mouth area has a first cylindrical gap segment and, opposite to the direction of extrusion, a conically enlarged second gap segment. This extrusion gap is formed by an annular body with a circular cross section and a core coaxially disposed therein. As a result of the arrangement of the cylindrical gap segment, an extremely high pressure is produced in the area of the transition from the conical into the cylindrical gap segment when the plastic is extruded, which is used to great advantage in the present invention. A reduction of the intake port of the supply channels is more effective as the larger such a reduction is with respect to the entire cross section of the intake port. Hence, the smaller the diameter of the intake ports, for example, by upsetting their external zones, the more strongly the flow of plastic can be influenced. Hence, the invention proposes to have the supply channels branch off within the first cylindrical gap segment shortly after the transition from the conical into the cylindrical gap section from the extrusion gap, since in this area in the cross section of the supply channels, due to the high pressures prevailing in this portion of the die head, can be correspondingly small. In a preferred embodiment, the supply channels have an intake segment of correspondingly small cross section which branches off from the extrusion gap, to which is connected an enlarged exhaust segment in communication with the corresponding forming groove. The diameter of the latter is so selected that the entire area of the forming groove in question is filled with plastic, so that a perfect profile formation is ensured. In order to use the pressure conditions prevailing at the aforementioned portion of the die head to best advantage, it is proposed to arrange the intake portion of the supply channels at substantially right angles to the exhaust portion of the supply channels and to the cylindrical gap portion of the extrusion gap. In a further embodiment of the invention, the diameter of the intake ports of the supply channels is adapted to the gap width of the extrusion gap.

BRIEF DESCRIPTION OF THE DRAWINGS

The invention, its organization and construction will be best understood from reference to the following description taken in conjunction with the accompanying drawings which illustrate embodiments of the invention, as well as a film made with the aid thereof provided with profile ledges, which film is further processed into bags, and wherein:

FIG. 1 is a fragmentary pictorial view of a film tube such as processed by a ring-shaped extrusion gap in accordance with the principles of the present invention;

FIG. 2 is an elevational view, partially in section, of a die head provided with a ring-shaped extrusion gap;

FIG. 3 is a partial plane view of the forming plate having forming grooves which serve to form the profile ledges; and FIG. 4 is an enlarged illustration of a portion of FIG. 2 showing the supply channels.

DESCRIPTION OF THE PREFERRED EMBODIMENT

In accordance with the present invention, a plastic tube 70 (FIG. 1) can be extruded as a tube which has a pair of profile ledges on its inner side forming a hollow rib 72 and a solid rib 74 having a corresponding cross section. These two ribs 72, 74, form in telescope fashion, a closure device which is well known and which is not further discussed.

In the drawings, the die head has as its principal components a jet shell 22, into which a jet cone 24 is inserted, preferably in the center thereof, in a manner well known in the art. Between the jet cone 24 and the jet shell 22 there is a ring-shaped channel 26 for the bulk material, in which an intermediate wall 28 is arranged having channels therethrough in communication with an upper channel section 30 and a lower channel section 32. The lower channel section 32 is connected to an extruder, identified in its entirety by reference numeral 36, via a communication channel 34. The upper channel section 30 is in communication with the extrusion gap which includes a first cylindrical gap portion 29 in the area of its mouth and opposite to the direction of extrusion with a conically enlarged gap section 31.

At the upper end of the jet cone 24, two supply channels 40 and 42 are arranged at an angular distance from each other, which channels open toward the front side of the jet cone 24. These supply channels are in fluid communication with the cylindrical gap portion 29 of the extrusion gap.

The jet cone 24 is covered by a forming plate 48 which has profile slots 50, 52 therein to form the profile ledges 72, 74 of the tube film 70 as hollow and solid ribs, respectively. The form plate 48 is carried above the jet cone 24 with the profile slots 50, 52 in fluid communication with supply channels 40, 42 and, therethrough, in communication with the cylindrical gap portion 29. It is evident in FIG. 2 that the jet cone 24 is penetrated in a longitudinal direction by an air channel 58 connected to an air supply (not shown through conduit 60 for inflating the plastic tube as it leaves the bellows. The supply channels 40 and 42 are located in the immediate area of the circumference of the jet cone 24 and are arranged axially parallel to the gap portion 29 of the extrusion gap.

Referring to FIG. 4, the supply channels have an intake segment 62 disposed perpendicularly to the cylindrical gap portion 29 of the extrusion channel and an exhaust segment 64 disposed perpendicularly to intake segment 62, or axially parallel to the gap portion 29. The intake segment 62 of the supply channels is provided in an area within the cylindrical gap portion 29 and shortly after, or downstream of, the transition from the conically enlarged gap portion 31, and branches off from cylindrical gap portion 29. In this area of the extrusion gap, there prevails an extremely great pressure during the treatment of the plastic so that the diameter of the intake segment 62 corresponds substantially to the gap width (a) of the cylindrical segment 29, or is substantially smaller than the end diameter of the exhaust segment 64 of the supply channels. In the present example, the exhaust segment 64 is twice reduced in diameter in the direction of the intake segment 62, as can be seen on the lower segment 66. In order to be able to control the flow of plastic material branched off from the gap portion 29 through the intake segment 62 of the supply channels, an intake port 68 of the intake segment 62 is designed, according to the invention, so that its cross section can be reduced, and to this end the jet cone 24, at least in the area of the intake segment 62, is constructed of deformable material such as tool steel, aluminum, copper, brass, or the like so that, for example, by means of a ball-shaped drift punch, the edge of the intake segment 62 may be upset, as indicated at 70, to reduce the cross section of the intake port 68 to the desired size. Further, as indicated by reference 72, such a desired size may be obtained by providing a removable insert, the opening of which is of different size for different inserts whereby, replacement of an insert changes the cross-sectional area of the intake port and the intake port can thereby be varied. Thus, the invention assures that in an assembled head, the cross section of the intake port of the supply channels, cannot be changed by external influences once such cross section has been determined.

Although the invention has been described by reference to specific illustrative embodiments, it is expected that many changes or modifications thereof will become apparent to